United States Patent
Vacondio et al.

(10) Patent No.: US 9,219,551 B2
(45) Date of Patent: Dec. 22, 2015

(54) METHOD OF DEMODULATING A PHASE MODULATED OPTICAL SIGNAL

(75) Inventors: Francesco Vacondio, Paris (FR); Oriol Bertran-Pardo, Paris (FR)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/122,332

(22) PCT Filed: Jun. 20, 2012

(86) PCT No.: PCT/EP2012/061787
§ 371 (c)(1),
(2), (4) Date: Nov. 26, 2013

(87) PCT Pub. No.: WO2013/000779
PCT Pub. Date: Jan. 3, 2013

(65) Prior Publication Data
US 2014/0186057 A1   Jul. 3, 2014

(30) Foreign Application Priority Data
Jun. 29, 2011   (EP) .................................. 11305827

(51) Int. Cl.
*H04B 10/61* (2013.01)
*H04B 10/2507* (2013.01)
(Continued)

(52) U.S. Cl.
CPC .......... *H04B 10/676* (2013.01); *H04B 10/2513* (2013.01); *H04B 10/60* (2013.01); *H04B 10/61* (2013.01)

(58) Field of Classification Search
CPC .................... H04B 10/2507; H04B 10/25073; H04B 10/2513; H04B 10/61; H04B 10/611; H04B 10/615; H04B 10/616; H04B 10/6161; H04B 10/6165; H04B 10/63; H04B 2210/25; H04B 2210/252
USPC .................. 398/158, 159, 202–204, 208–210
See application file for complete search history.

(56) References Cited

U.S. PATENT DOCUMENTS

| 7,606,498 B1 * | 10/2009 | Wu et al. ........................ 398/152 |
| 8,374,512 B2 * | 2/2013 | Tao et al. ....................... 398/202 |

(Continued)

FOREIGN PATENT DOCUMENTS

| CN | 1394005 | 1/2003 |
| CN | 1394027 | 1/2003 |

(Continued)

OTHER PUBLICATIONS

Zhou, Xian et al; Digital Timing Recovery Combined with Adaptive Equalization for Optical Coherent Receivers; Communications and Photonics Conference and Exhibition, 2009; ACP 2009; Asia, IEEE, Piscataway, NJ, USA; Nov. 2, 2009; pp. 1-6; XP031623309; ISBN: 978-1-55752-877-3.

(Continued)

*Primary Examiner* — Dalzid Singh
(74) *Attorney, Agent, or Firm* — Patti & Malvone Law Group, LLC (57) ABSTRACT

Proposed is a method of demodulating a phase modulated optical signal received from an optical channel. A time-discrete electrical signal is derived from the phase modulated optical signal, using a local optical signal, which has a frequency that is essentially equal to a carrier frequency of the phase modulated optical signal. A phase error between the local optical signal and the phase modulated optical signal is compensated, by deriving from the local optical signal a phase offset and modifying the derived time-discrete electrical signal by this phase offset. A chromatic dispersion caused by the optical channel is compensated, by filtering the modified time-discrete electrical signal using a digital filter.

7 Claims, 6 Drawing Sheets

(51) Int. Cl.
*H04B 10/2513* (2013.01)
*H04B 10/67* (2013.01)
*H04B 10/60* (2013.01)

(56) References Cited

U.S. PATENT DOCUMENTS

| | | | |
|---|---|---|---|
| 8,639,126 B1* | 1/2014 | Nimon et al. | 398/203 |
| 8,649,689 B2* | 2/2014 | Koizumi et al. | 398/204 |
| 2006/0285854 A1* | 12/2006 | Sun et al. | 398/155 |
| 2009/0148164 A1* | 6/2009 | Roberts et al. | 398/65 |
| 2010/0014873 A1 | 1/2010 | Bulow | |
| 2010/0266291 A1* | 10/2010 | Boffi et al. | 398/159 |
| 2010/0329698 A1* | 12/2010 | Nakashima | 398/208 |
| 2012/0189318 A1* | 7/2012 | Mo et al. | 398/152 |
| 2013/0195455 A1* | 8/2013 | Jansen et al. | 398/65 |

FOREIGN PATENT DOCUMENTS

| | | |
|---|---|---|
| CN | 101931469 | 12/2010 |
| EP | 2146448 | 11/2010 |
| EP | 2273703 | 1/2011 |
| JP | 2012175581 | 9/2012 |
| KR | 20110039445 | 4/2011 |

OTHER PUBLICATIONS

Colavolpe, G. et al; Phase Noise Sensitivity and Compensation Techniques in Long-Haul Coherent Optical Links; Conference Paper; Jan. 2010; Research Gate; DOI:10-1109/GLOCOM.2010.5684303—Source DBLP; IEEE.

* cited by examiner

METHOD OF DEMODULATING A PHASE MODULATED OPTICAL SIGNAL

FIELD OF THE INVENTION

The invention is based on a priority application EP11305827.5 which is hereby incorporated by reference.

The invention relates to a method and a device for demodulating a phase modulated optical signal that is received from an optical channel.

BACKGROUND

In optical data transmission, data values may be transmitted by means of a phase modulated optical transmission signal. The optical transmission signal is generated, by modulating the phase of an optical carrier signal, which possesses a carrier frequency, in dependence on the transmitted data values and in accordance with a constellation diagram of a respective phase-shift keying (PSK) modulation method. Each point of the constellation diagram represents a finite set of data values that are to be transmitted, wherein the set of data values is called a data symbol. A data symbol is represented by a corresponding constellation point of a constellation diagram, wherein the constellation point has a corresponding symbol phase value. Depending on the data symbols that are to be transmitted, respective constellation points and symbol phase values are derived. A signal that corresponds to a symbol phase value can be interpreted as a superposition of an inphase signal component and a quadrature signal component, wherein both signal components have a same frequency,
the inphase signal component has a phase that is equal to zero, while the quadrature signal component has a phase that differs from the phase of the inphase signal component by $\pi/2$, and
the respective amplitudes of the two signal components determine the corresponding symbol phase value.

The phase of the optical carrier signal is modulated, such that it corresponds to the derived symbol phase values representing the respective data symbols. The generated optical signal is then transmitted over an optical channel.

At a receiving side, the transmitted optical signal is received from the optical channel and demodulated, using a coherent reception scheme: the received optical signal is mixed with a local optical signal that possesses the carrier frequency and a phase, which is ideally equal to the phase of the optical carrier signal used at the transmitting side. The local optical signal is provided by a local oscillator present at the receiving side. The mixing of the optical signals with the local optical signal yields an inphase signal component and a quadrature signal component in the electrical domain, wherein these signal components can be superposed to form a received signal in the electrical domain.

Using a hard decision detection scheme, it may be decided for that point of the constellation diagram, whose symbol phase value is most similar to the phase value represented by the received electrical signal. Thus, received data can be derived from the derived signal components.

For transmitting data values at a higher data rate, the concept of phase-modulation used in PSK may be extended, by not only modulating the phase of the optical signal but also modulating the amplitude of the optical signal. Such a combined phase and signal modulation is also known as Quadrature Amplitude Modulation (QAM).

SUMMARY

It is an objective, to improve the known method of optical data transmission.

Proposed is a method of demodulating a phase modulated optical signal received from an optical channel. The method comprises different steps.

A time-discrete electrical signal is derived from the phase modulated optical signal, using a local optical signal that has a frequency that is essentially equal to a carrier frequency of the phase modulated optical signal.

A phase error between the local optical signal and the phase modulated optical signal is compensated, by deriving from the local optical signal a phase offset and modifying the derived time-discrete electrical signal by this phase offset.

A chromatic dispersion caused by the optical channel is compensated, by filtering the modified time-discrete electrical signal using a digital filter.

In order to appreciate the advantages of the proposed method, the following aspects have to be considered.

When transmitting an optical signal over a non-ideal optical channel, the optical signal may be disturbed by the effect of chromatic dispersion occurring within the optical channel. The effect of chromatic dispersion onto the transmitted optical signal can be interpreted as that of filtering the optical signal with a complex transfer function in the frequency domain. In the case that an optical fiber is used for transmission, this transfer function can be estimated if the type of the fiber and the length of the fiber are known. Thus, chromatic dispersion caused by an optical channel can be compensated at the receiving side, by filtering the derived electrical signal components by a digital filter that has a transfer function in the frequency domain which is inverse to the estimated transfer function.

When deriving the electrical signal components from the PSK modulated optical signal, a phase error of the local optical signal remains present in the time-discrete electrical signal. If afterwards, chromatic dispersion of the optical channel is compensated, by filtering this time-discrete electrical signal by a digital with a complex frequency response, then this filtering causes a transformation of the phase error into an amplitude error, which can be derived in detail. Such an amplitude error is difficult to compensate at a later stage of processing. Normally, further steps of processing only take care of compensating remaining phase errors. Thus, the remaining amplitude error may affect data values derived later on from the electrical signal.

The proposed method has the advantage, that the phase error, that is caused by the local optical signal and that is present within the time-discrete electrical signal, is compensated, before the electrical signal is filtered by the digital filter, that has a complex frequency response and that would transform the phase error into an amplitude error. Thus, the effect of an amplitude error within the electrical signal caused by this filtering is reduced. Therefore, data values may be derived more reliably from the electrical signal.

DESCRIPTION OF EMBODIMENTS

When transmitting digital data using phase modulation of an optical signal, the optical signal may be subject to chromatic dispersion caused by the optical channel via which the optical signal is transmitted. Such a chromatic dispersion can be described in the frequency domain as a transfer function, which depends on the frequency f of the signal, the length L of the optical fibre used as the optical channel and a constant β, which may provided by a specification sheet if the type of the optical fibre is known. The resulting transfer function $H_{DISP}$ caused by chromatic dispersion can then be written as $$H_{DISP} = e^{j\beta L f^2}.$$

In order to compensate the effect of chromatic dispersion, the received optical signal may be filtered in the digital domain by a digital filter, whose transfer function is inverse to that caused by chromatic dispersion.

When deriving received data values from a received optical signal, the method of coherent reception, in which the optical signal is mixed with a local optical signal that has essentially the same frequency as the carrier frequency of the optical signal, is a common measure. By this, a based-band optical signal is obtained.

For such a method of coherent reception, the local optical signal has to have a phase that is identical to a phase of an optical carrier signal used for generating the optical signal at a transmission side. In the case, that the local optical signal has a phase offset to the optical carrier signal used for generating the optical signal, this phase offset may be considered as a phase error present within the derived optical base-band signal. Such a phase error may be transformed into an amplitude error, in the case that the optical base-band signal is filtered by a digital filter that compensates a chromatic dispersion. A remaining amplitude error within the dispersion compensated signal is of disadvantage, since at further stages of signal processing it is only usual to compensate remaining phase errors, but not to compensate amplitude eras. Therefore, once a phase error of the local optic signal present within the optical base-band signal is transformed into an amplitude error, this amplitude error may not be fully compensated at later stages of processing. This leads to erroneously derived data values when demodulating the received optical signal.

The details of a translation of a phase error into an amplitude error caused by the digital filter of chromatic dispersion may be seen within "Irshaad Fatadin and Seb J. Savory, 'Impact of phase to amplitude noise conversion in coherent optical systems with digital dispersion compensation,' Opt. Express 18, 16273-16278 (2010)".

In order to minimize disadvantages effects of a phase error of the local optical signal, a method of demodulating a phase modulated optical signal is proposed, wherein the phase error of the local optical signal is compensated before compensating a chromatic dispersion using a digital filter.

Figure 1:
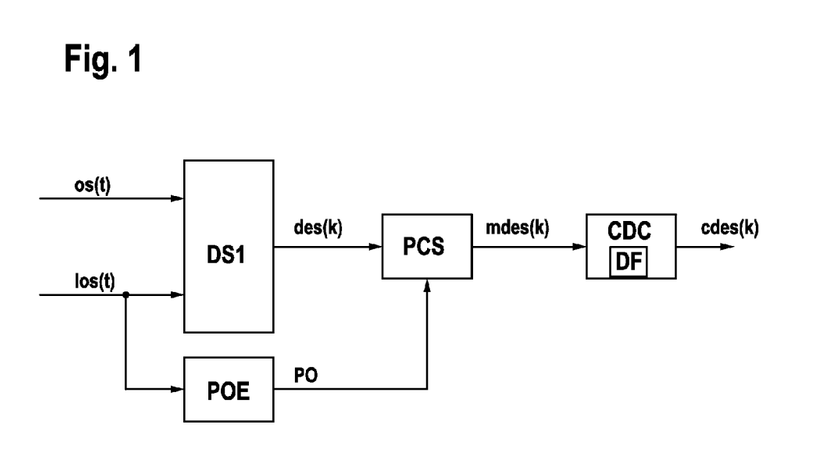
FIG. 1 shows different steps for compensating a phase error in a chromatic dispersion.

FIG. 1 shows an optical signal os(t) received from an optical channel. Furthermore FIG. 1 shows a local optical signal los(t), which has essentially the same frequency as a carrier frequency of the optical signal os(t).

The local optical signal los(t) is provided by a local oscillator not shown in FIG. 1.

This local oscillator may be an integral part of a receiving device.

In a derivation step DS1, a time-discrete electrical signal des(k), with time-discrete index k, is derived from the received optical signal os(t). For this, the local optical signal los(t) is used. The time-discrete electrical signal des(k) is determined, such that it has a sampling rate $f_{sa1}$.

A phase offset PO is derived from the local optical signal los(t) within a phase offset estimation step POE.

Within a phase compensation step PCS, the derived time-discrete electrical signal des(k) is modified by the derived phase offset PO. This yields the modified time-discrete electrical signal mdes(k).

The modified time-discrete electrical signal mdes(k) is filtered by a digital filter DF within a step of chromatic dispersion compensation CDC, which yields a compensated time-discrete electrical signal cdes(k).

As previously outlined, the advantage of the proposed method shown in FIG. 1 is, that within the phase compensation step PCS, a phase error of the local optical signal los(t) is minimized, which reduces the effect of the step of chromatic dispersion compensation CDC translating such a phase error into an amplitude error present within the compensated electrical signal cdes(k).

From the compensated electrical signal cdes(k), a further signal may be derived, by compensating a remaining phase error in the digital domain. Such a step of compensating a remaining phase error is not shown in FIG. 1. After a compensation of a remaining phase error, the resulting signal may be used for deriving data symbols in data values in accordance with a PSK or QAM modulation scheme used at a transmitting side.

Figure 2:
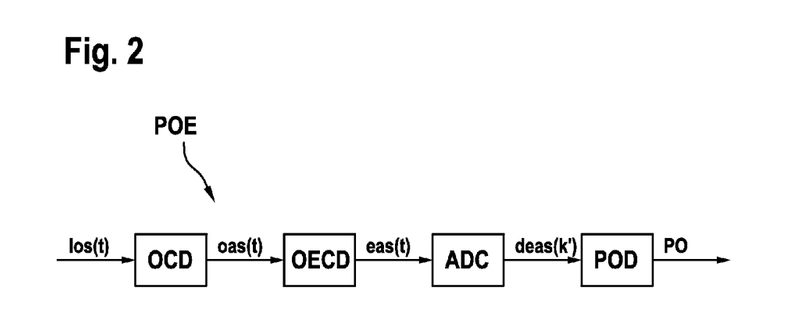
FIG. 2 shows different steps of deriving a phase offset from a local optical signal.

FIG. 2 shows different sub-steps of the phase offset estimation step POE for deriving the phase offset PO from the local optical signal los(t).

Using an optical phase to amplitude conversion device OCD, a phase component present within the local optical signal los(t) is converted into a generated optical amplitude signal oas(t).

Examples of devices that may be used as the optical phase to amplitude conversion device OCD are a delay-line interferometer, a Michelson interferometer or an optical filter. Preferably, the optical filter has a characteristic transfer function such as a notch filter, wherein frequency of the local oscillator signal los(t) lies within the transition range of the filter.

The optical amplitude signal oas(t) is converted to an analogue electrical amplitude signal eas(t), by providing the optical amplitude signal oas(t) to an optical electrical conversion device OECD, such as a photodiode.

Via an analogue digital converter ADC, the electrical amplitude signal eas(t) is converted to a time-discrete electrical amplitude signal deas (k'), with time-discrete index k'.

The time-discrete electrical amplitude signal deas (k') is generated by the analogue digital converter ADC at a sampling rate $f_{sa2}$. From the time-discrete signal deas (k'), the phase offset PO is derived in a derivation step POD.

The sampling rate $f_{sa2}$, at which the time-discrete signal deas (k') is provided, does not have to be the same sampling frequency as the sampling frequency $f_{sa1}$ used for providing the based-band signal des(k) in the electrical domain, as shown in FIG. 1. Due to the fact, that a phase component of the local optical signal los(t) changes at a rate, which is significantly lower than the signal frequency of the electrical based-band signal des(k), shown in FIG. 1, the sampling rate $f_{sa2}$ may be chosen smaller than the sampling rate $f_{sa1}$. Therefore, it is a clear advantage to determine the phase offset PO of the local optical signal los(t) as illustrated in FIG. 2, since by this an analogue digital converter ADC operating at a reduced sampling rate $f_{sa2} < f_{sa1}$ may be used, which makes it possible to use a cheaper analogue digital converter ADC for this than for generating the time-discrete based-band signal des(k) shown in FIG. 1.

Figure 3:
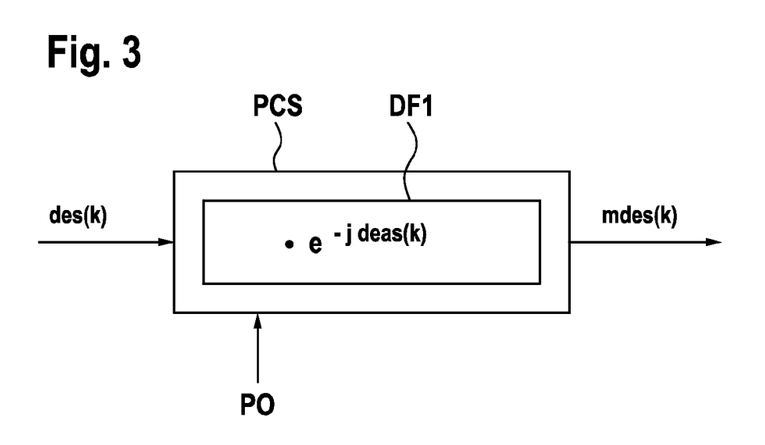
FIG. 3 shows the steps of compensating a phase error in detail.

FIG. 3 shows the step of phase compensation PCS in detail. The derived time-discrete electrical based-band signal des(k) is filtered by a digital filter DF1 for obtaining the modified electrical signal mdes(k). The phase offset PO that is provided to the digital filter DF1 has been derived within the derivation step POD, shown in FIG. 2, as the term $$e^{j\,deas(k)}.$$

For this, the sampling rate of the time-discrete electrical amplitude signal deas (k') is adjusted to the sampling rate $f_{sa1}$ of the time-discrete electrical based-band signal des(k). This is illustrated in FIG. 3 by the fact, that the electrical amplitude signal deas (k) has the same time-discrete index k as the electrical based-band signal des(k).

The electrical based-band signal des(k) is multiplied by the term $e^{-j\,deas\,(k)}$ within the digital filter DF1, for compensating the determined phase offset of the local optical signal.

The adjustment of a sampling rate of the electrical amplitude signal eas(k') to the sampling rate $f_{sa1}$ of the electrical based-band signal des(k), may be performed by up-sampling.

Figure 4:
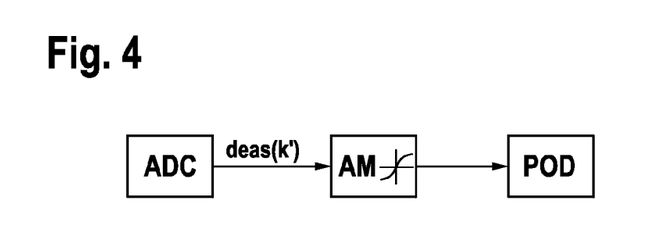
FIG. 4 shows a step of modifying an amplitude of a time-discrete electrical signal.

FIG. 4 shows an additional step of amplitude modification AM, which may be carried out between the steps of analogue digital conversion ADC and the step of phase offset derivation POD, which were already shown in FIG. 2. The derived electrical amplitude signal deas (k') may be subject to nonlinearities caused by a nonlinear behaviour of the optical conversion device OCD shown in FIG. 2, that was used for converting an optical phase component of the local optical signal into an optical amplitude signal. Such nonlinearities are compensated in the amplitude modification step AM, by modifying the amplitude of the electrical amplitude signal deas (k') according to a predefined compander function that compensates a nonlinear behaviour of the optical phase to amplitude conversion device OCD shown in FIG. 2.

In the case, that the optical conversion device OCD of FIG. 2 has a linear behaviour, but acts according to a linear function that has a slope which is unequal to 1, the step of amplitude modification AM may simply comprise a scaling of the electrical amplitude signal deas (k') by a constant factor.

Figure 5A:
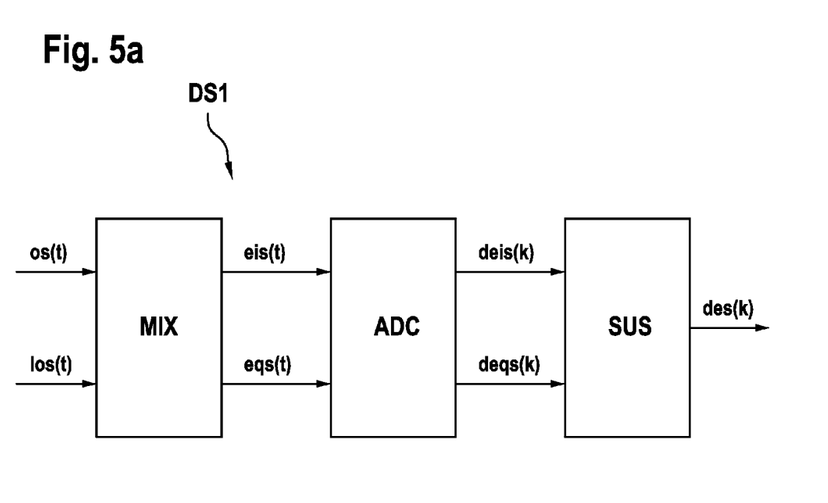
FIG. 5a shows different sub-steps of deriving a time-discrete electrical signal from a received optical signal.
Figure 5B:
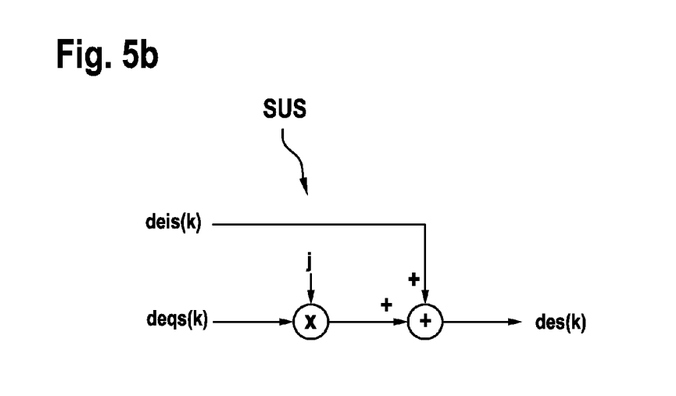
FIG. 5b shows a sub-step of superposing time-discrete electrical signal components.

FIG. 5a shows sub-steps of the step DS1 for deriving the time-discrete electrical signal des(k). Within a mixing step MIX, an analogue electrical in-phase signal component eis(t) and an analogue electrical quadrature signal component eqs(t) are derived from the phase modulated optical signal os(t), using the local optical signal los(t). Within a next step ADC of analogue digital conversion, the analogue electrical signal components eis(t), IQS(t) are converted into generated respective time-discrete electrical signal components deis(k), deqs(k).

Within a further step of superposition SUS, the generated time-discrete electrical signal components deis(k), deqs(k) are superposed, to yield the time-discrete electrical signal des(k).

Figure 6:
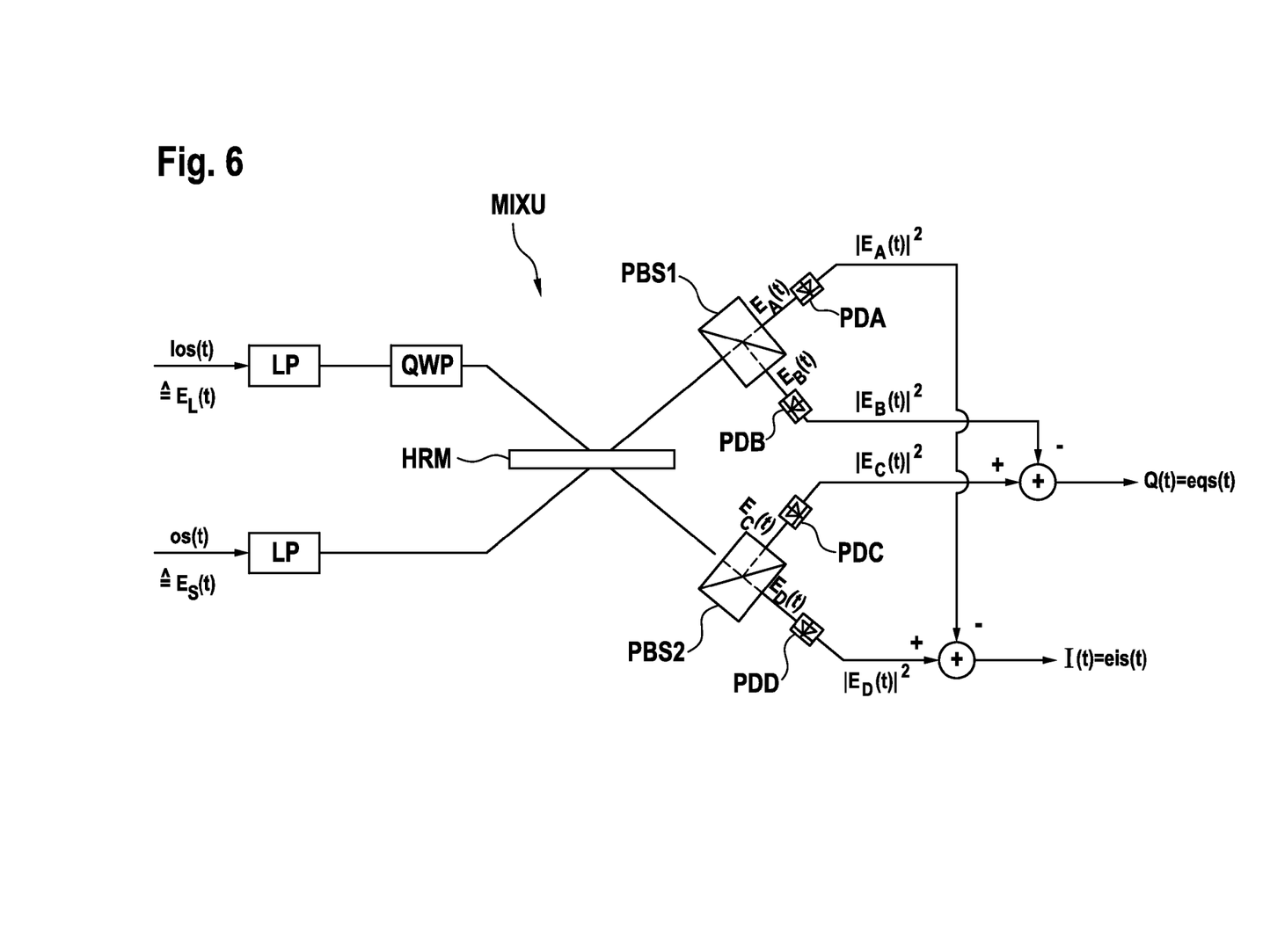
FIG. 6 shows a mixing unit used for deriving analogue electrical signal components from the phase modulated optical signal.

FIG. 5a shows the step of superposition SUS in detail. The time-discrete electrical quadrature signal component deqs(k) is multiplied by the factor j and then added to the time-discrete electrical in-phase signal component deis(k). This yields the time-discrete electrical signal des(k). FIG. 6 shows a mixing unit MIXU, which may be used for carrying out the step of mixing MIX previously shown in FIG. 5a.

FIG. 6 shows the received optical signal os(t), which has an electrical field ES(t), that can be described by an amplitude $A_s(t)$, a frequency $\omega_s$ and a phase $\phi_s$ as Equation 2.

The local optic signal los(t) has an electrical field EL(t), that can be described by amplitude $A_l$, a frequency $\omega_l$ and a phase $\phi_l$ as Equation 1.

The optical signal os(t) is provided to a linear polarizer LP. The linear polarizer LP polarizes the optical signal os(t), such that the resulting optical signal has an electrical field that is rotated by an angle of 45° to the principle axis of the two polarization beam splitters PBS1, PBS2 of the mixing unit MIXU. The local optical signal los(t) is provided to a linear polarizer LP, which aligns the optical signal and the electrical field, such that it is aligned in line with the fast axis of the following quarter-wave plate QWP.

The quarter-wave plate QWP causes a circular polarization of the incoming optical signal which yields with respect to the principal axis of the polarization beam splitters PBS1, PBS2 respective components, that are shifted by a phase of $\pi/2$. That optical component leaving the quarter-wave plate QWP, that is aligned with the passed through axis of the polarization beam splitters PBS1, PBS2, is shifted by $\pi/2$, while the other component does not experience a phase shift.

The linearly polarized optical signal os(t) coming from the linearly polarized LP is distributed by half-reflective mirror HRM to the polarization beam splitters PBS1, PBS2. Furthermore, the two signal components of the circularly polarized optical signal leaving the quarter-wave plate QWP are also distributed by this half-reflecting mirror HRM to the polarization beam splitters PBS1, PBS2.

Optical signals arriving at the polarization beam splitter PBS1 are split, such that optical signals lying within a polarization plane aligned with the pass-through axis of the polarization beam splitter PBS1 are transferred to a photodiode PDA. Optical signals coming in to the polarization beam splitter PBS1 in a polarization plane aligned with the reflecting axis of the polarization beam splitter PBS1 are reflected to a photodiode PDB. The electrical field of the optical signal reaching the photodiode PDA can be described as the electrical field EA(t). The electrical field of the optical signals reaching the photodiode PDB can be described as the electrical field EB(t).

The optical signals coming in to the polarization beam splitter PBS2 in alignment with the polarization plane corresponding to the pass-through axis of the polarization beam splitter PBS2 are passed on to a photodiode PDD. Optical signals coming in to the polarization beam splitter PBS2 in a polarization plane aligned with the reflecting axis of the polarization beam splitter PBS2 are reflected to a photodiode PDC.

The electrical field of the optical signal reaching the photodiode PDC can be considered as the electrical field EC(t). The electrical field of the optical signal reaching the photodiode PDD can be considered as the electrical field ED(t).

The electrical fields reaching the photodiodes PDA, PDB, PDC, PDD can be described as it will be now shown in detail below.

The electrical field ES(t) does not experience any phase shift by the half-reflective mirror HRM known by the polarization beam splitter PBS1. Therefore, the electrical field ES(t) is not subject to a phase shift. The electrical field EO(t) is subject to a phase shift by $\pi/2$ due to the reflection by the half-reflective mirror HRM, as well as a phase shift by $\pi/2$ caused by the quarter-wave plate QWP. Therefore the electrical field EL(t) experiences overall phase shift by $\pi$ before reaching the photodiode PDA. Therefore, the electrical field EA(t) can be described as Equation 7.

The electrical field ES(t) experiences a phase shift by $\pi/2$ before reaching the photodiode PDB, due to the reflection within the polarization beam splitter PBS1. The electrical field EO(t) experiences a first phase shift by $\pi/2$ at the half-reflecting mirror and a second phase shift by $\pi/2$ during the reflection within the polarization beam splitter PBS1, before reaching the photodiode PDB. Therefore, the electrical field EB(t) can be written as Equation 8.

The electrical field ES(t) experiences a phase shift by $\pi/2$ due to the reflection at the half-reflective mirror HRM as well as a phase shift by $\pi/2$ during the reflection within the polarization beam splitter PBS2, before reaching photodiode PDC. The electrical field EL(t) experiences a phase shift by $\pi/2$ within the polarization beam splitter PBS2 during the reflection before reaching the photodiode PDC. Therefore, the electrical field EC(t) can be written as Equation 9.

The electrical field ES(t) experiences a phase shift by $\pi/2$ at the half-reflective mirror HRM, before reaching the photodiode PDD. Furthermore, the electrical field EO(t) experiences a phase shift by $\pi/2$ within the quarter-wave plate QWP, before reaching the photodiode PDD. Therefore, the electrical field ED(t) can be written as Equation 10.

The photodiodes PDA, PDB, PDC, PDD generate electrical signals at their outputs, which correspond to the intensities of the electrical fields reaching the photodiodes PDA, PDB, PDC, PDD, therefore each photodiode, PDA, PDB, PDC, PDD, generates electrical signals $|E_A(t)|^2$, $|E_B(t)|^2$, $|E_C(t)|^2$, $|E_D(t)|^2$ which are equivalent to the squared magnitudes of the electrical signals reaching the photodiodes PDA, PDB, PDC, PDD.

The electrical signal $|E_B(t)|^2$ provided by the photodiode PDB is subtracted from the electrical signal $|E_C(t)|^2$ provided by the photodiode PDC. This yields a signal Q(t), which can be shown to be and be described as $$Q(t) = |E_C(t)|^2 - |E_B(t)|^2$$
$$= \frac{1}{2} A_S(t) \cdot A_L \cdot \sin(\varphi_1(t)).$$

Furthermore, the electrical signal $|E_A(t)|^2$ provided by the photodiode PDA is subtracted from the electrical signal $|E_D(t)|^2$ provided by the photodiode PDD, which yields an electrical signal I(t), which can be derived as $$I(t) = |E_D(t)|^2 - |E_A(t)|^2$$
$$= \frac{1}{2} A_S(t) \cdot A_L \cdot \cos(\varphi_1(t)).$$

Within the electrical signals I(t), Q(t), the phase $\varphi_1(t)$ can be shown to be $$\varphi_1(t) = (\omega_S - \omega_L) \cdot t + \varphi_S(t) - \varphi_L(t).$$

In the case, that the frequency $\omega_L$ of the local optical signal los(t) is essentially equal to the frequency $\omega_S$ of the optical signal os(t), the phase $\varphi_1(t)$ of the signals I(t), Q(t) is reduced to the difference between the phase $\varphi_S(t)$ of the optical signal os(t) and the phase $\varphi_L(t)$ of the local optical signal los(t) as $$\varphi_1(t) \approx \varphi_S(t) - \varphi_L(t).$$

Therefore, the signal I(t) can be considered as an electrical in-phase signal component I(t)=eis(t) of the optical based-band signal obtained by mixing the optical signal os(t) with the local optical signal los(t). Furthermore, for the same reason explained above, the signal Q(t) can be considered as an electrical quadrature signal component Q(t)=eqs(t) of an optical based-band obtained by mixing the optical signal os(t) with the local optical signal los(t).

Figure 7:
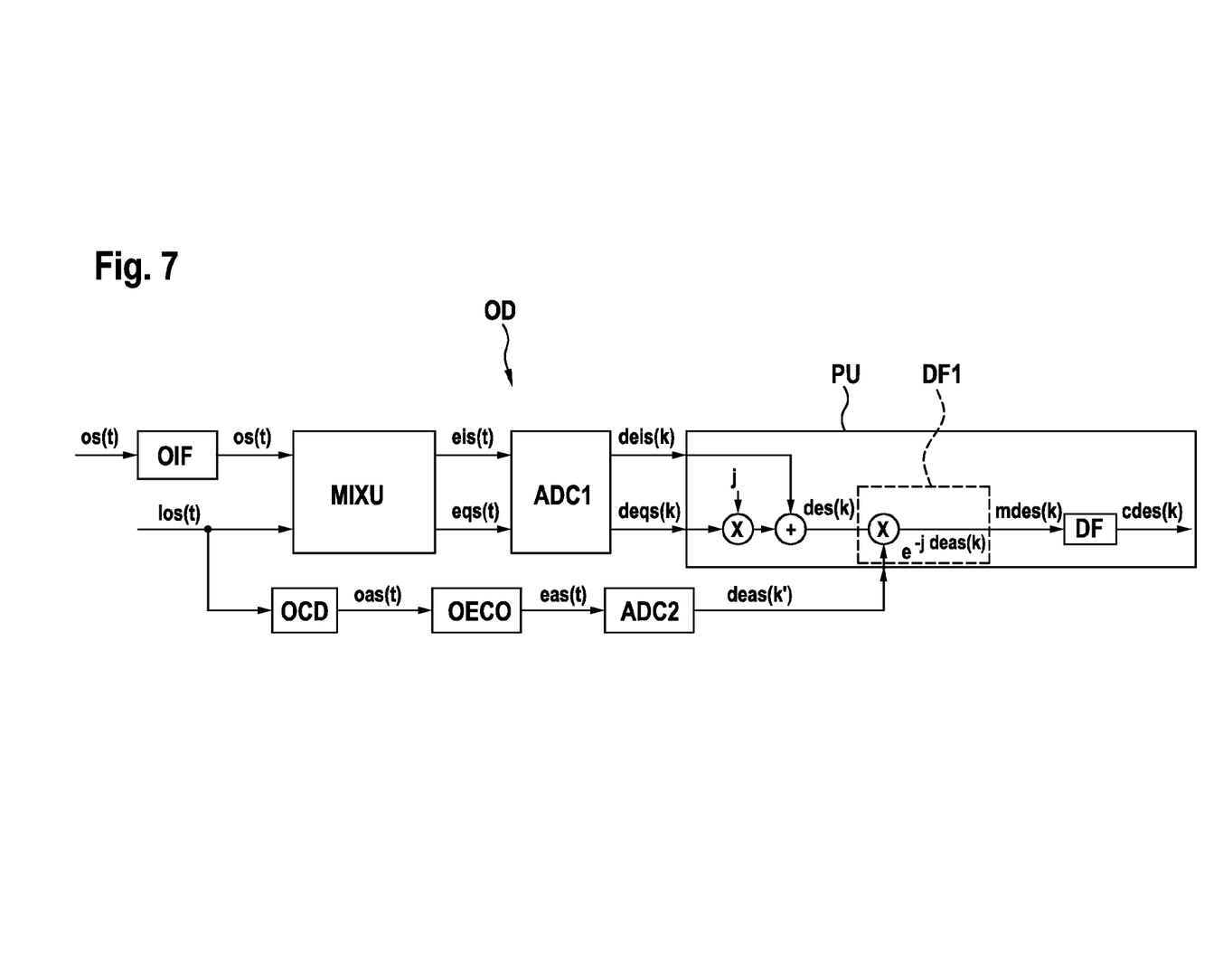
FIG. 7 shows a device for demodulating a phase-modulated optical signal received from an optical channel.

FIG. 7 shows a device for demodulating a phase-modulated optical signal OD. The optical signal os(t) is received at an optical interface OIF. This optical signal os(t) is provided to a mixing unit MIXU, as previously described in FIG. 6, together with a local optical signal los(t). The local optical signal los(t) is provided by a local oscillator, that may be an integral part of the optical device OD.

The mixing unit MIXU generates an electrical in-phase signal component eis(t) as well as an electrical quadrature signal component eqs(t). An analogue digital converter ADC 1 converts the analogue electrical signal components eis(t), eqs(t) into respective time-discrete electrical signal components deis(k), deqs(k).

The time-discrete signal components deis(k), deqs(k) are provided to a processing unit PU. The processing unit PU superposes the time-discrete signal components deis(k), deqs (k), by multiplying the quadrature signal component deqs(k) by a factor of j and adding it to the electrical in-phase signal component deis(k). This yields the time-discrete electrical based-band signal des(k).

A fraction of the local optical signal los(t) is provided to an optical conversion device OCD, which converts an optical phase component of the local optical signal los(t) into an optical amplitude signal oas(t). An optical electrical conversion device converts optical amplitude signal oas(t) into electrical amplitude signal eas(t). An analogue digital converter ADC 2 converts the electrical amplitude signal eas(t) into a time-discrete electrical amplitude signal deas (k').

The time-discrete electrical amplitude signal deas (k') is provided to the processing unit PU, which determines a phase offset between the local optical signal los(t) and a carrier signal used for generating the optical signal os(t) as the term $e^{j\,deas\,(k)}$.

Using a digital filter DF1, the processing unit PU compensates the phase offset of the local optical signal los(t), by multiplying the electrical based-band signal des(k) by the term $e^{j\,deas\,(k)}$.

This yields the modified electrical signal mdes(k). Using a digital filter DF, the processing unit PU compensates a chromatic dispersion caused by the optical channel. This yields the compensated electrical signal CDS(k).

Figure 8:
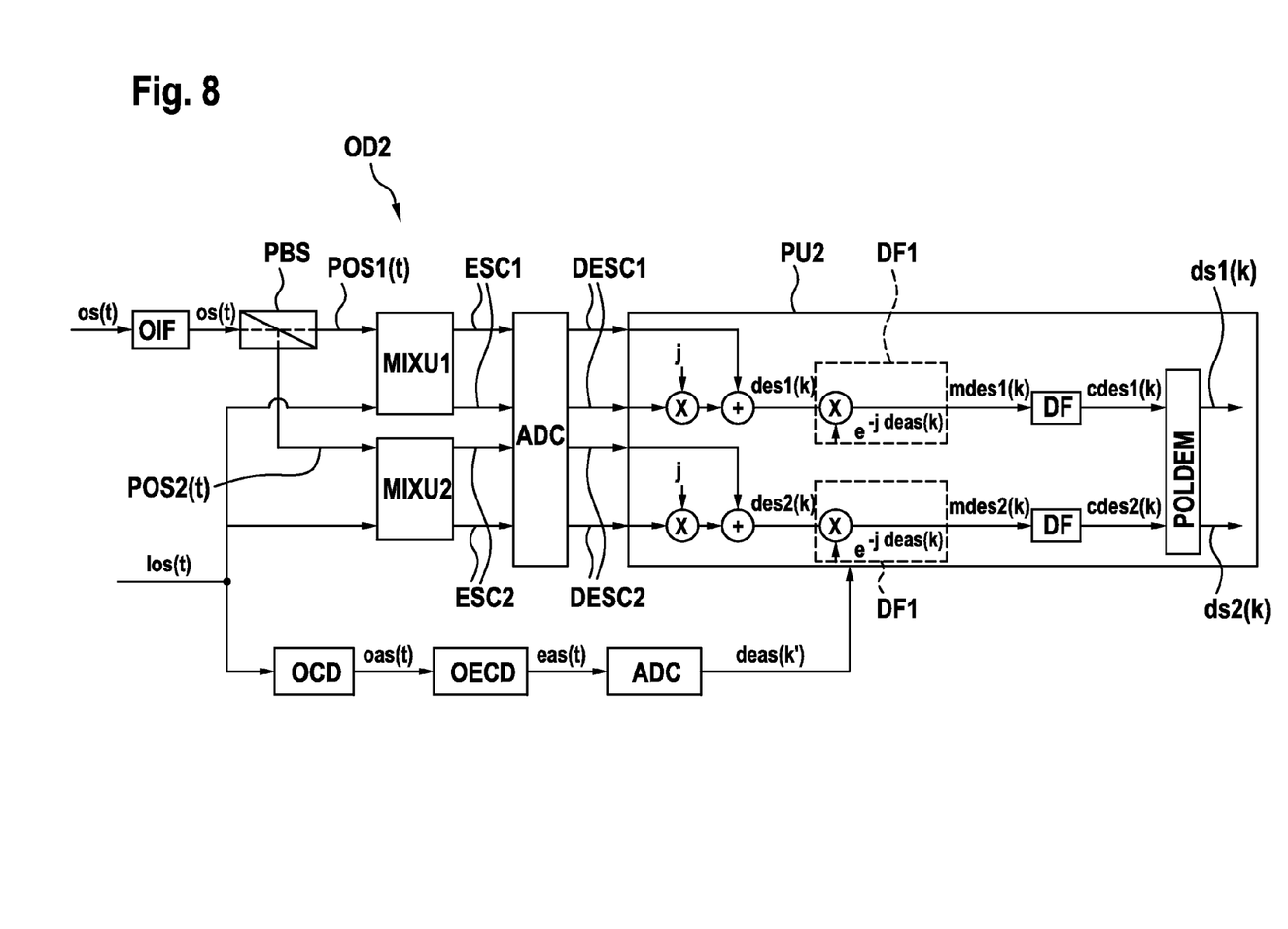
FIG. 8 shows a device for demodulating a phase-modulated optical signal received from an optical channel according to a further embodiment.

FIG. 8 shows an extended optical device OD2, that may be used in the case that the optical signal os(t) carries digital data within two orthogonal polarization planes using the concept of polarization division multiplexing.

The received optical signal os(t) is split by a polarization beam splitter PBS into a first polarized optical signal POS1($t$) and a second polarized optical signal POS2($t$).

Each of the polarized optical signals POS1($t$), POS2($t$) is handled by a respective mixing unit MIXU 1, MIXU 2, in order to yield respective electrical signal components ESC1, ESC2, using the local optical signal los(t). The respective electrical signal components ESC1 and ESC2 are then converted by analogue digital converter ADC into respective digital electrical signal components DESC1, DESC2. From each set of the discrete electrical signal components DESC1, DESC2, respective electrical based-band signals des1($k$), des2($k$) are derived in a manner that corresponds to that previously described in respect of FIG. 7. Each of the electrical based-band signal des1(k), des2(k) are filtered by a digital filter DF1 for compensating a phase error of the local optical signal los(t), as it has been described in detail previously with respect to FIG. 7.

Therefore, from each electrical based-band signals des1 (k), des2(k) respective modified electrical signals mdes 1(k), mdes 2(k) are obtained. These modified signals are then filtered by a digital filter DF, for compensating a chromatic dispersion caused by the optical channel. This yields the respective compensated electrical signals cdes1(k), cdes2(k). Within a step of polarization division demultiplexing POL-DEM these signals may then be subject to equalization by algorithm such as the constant modulus algorithm. Such an equalization may be carried out by four finite impulse response filters filtering the signals cdes1(k), cdes2(k), from which respective data streams can be derived in accordance with PSK or QAM constellation diagram used at the transmitting side. The filter coefficients of the finite impulse response filters may be determined using a constant modulus algorithm as described in "Digital Coherent Optical Receivers: Algorithms and Subsystems, Seb J. Savory, IEEE JOURNAL OF SELECTED TOPICS IN QUANTUM ELECTRONICS, VOL. 16, NO. 5, SEPTEMBER/OCTOBER 20102".

The devices OD and/or OD2 are furthermore adapted to carry out further steps of one or more methods described with regard to the FIGS. 1 to 8. For calculation steps, the devices OD and/or OD2 may rely on the signal processing unit PU and/or on other units not explicitly shown in the FIGS. 7 and 8.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the FIGS. 7 and 8, including any functional blocks labelled as "device", "unit" or "processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the terms "processing unit", "device" or "unit" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. It should be appreciated by those skilled in the art that any block diagrams herein represent conceptual views of illustrative circuitry embodying the principles of the invention.

The invention claimed is:

1. A method for demodulating a phase modulated optical signal received from an optical channel, comprising the steps of:
    deriving a time-discrete electrical signal from the phase modulated optical signal using a local optical signal which has a frequency that is essentially equal to a frequency of a carrier optical signal of the phase modulated optical signal;
    compensating for a phase error between the local optical signal and the carrier optical signal by deriving from the local optical signal a phase offset, and modifying the time-discrete electrical signal by the phase offset to produce a modified time-discrete electrical signal; and
    compensating for a chromatic dispersion caused by the optical channel by filtering the modified time-discrete electrical signal using a digital filter.

2. The method of claim 1, wherein the step of deriving the phase offset comprises the steps of:
    generating an optical amplitude signal from the local optical signal using an optical phase to amplitude conversion device;
    converting the optical amplitude signal to an analogue electrical amplitude signal;
    converting the analogue electrical amplitude signal to a time-discrete electrical amplitude signal; and
    deriving the phase offset from the time-discrete electrical amplitude signal.

3. The method of claim 2, further comprising the step of:
    modifying the amplitude of the time-discrete electrical amplitude signal to compensate for the optical phase to amplitude conversion device.

4. The method of claim 3, further comprising the step of:
    operating the optical phase to amplitude conversion device within a linear range.

5. The method of claim 1, wherein the step of deriving the time-discrete electrical signal comprises the steps of:
    deriving an analogue electrical inphase signal component and an analogue electrical quadrature signal component from the phase modulated optical signal using the local optical signal;
    generating respective time-discrete electrical signal components, by sampling the analogue electrical inphase signal component and the analogue electrical quadrature signal component; and
    superposing the time-discrete electrical signal components.

6. The method of claim 5, further comprising the step of:
    compensating for a remaining phase error using a second digital filter.

7. An apparatus for demodulating a phase modulated optical signal received from an optical channel, comprising a device adapted to:
    derive a time-discrete electrical signal from the phase modulated optical signal using a local optical signal which has a frequency that is essentially equal to a frequency of a carrier optical signal of the phase modulated optical signal;
    compensate for a phase error between the local optical signal and the carrier optical signal by deriving from the local optical signal a phase offset, and modifying the time-discrete electrical signal by the phase offset to produce a modified time-discrete electrical signal; and
    compensate for a chromatic dispersion caused by the optical channel by filtering the modified time-discrete electrical signal using a digital filter.

* * * * *